June 1, 1965

J. P. MURDOCH 3,186,183

AIR CONDITIONING SYSTEM

Filed Nov. 20, 1964

INVENTOR:
JOHN P. MURDOCH
BY
Howson & Howson
ATTYS.

United States Patent Office 3,186,183
Patented June 1, 1965

3,186,183
AIR CONDITIONING SYSTEM
John P. Murdoch, 204 Glenn Road, Ardmore, Pa.
Filed Nov. 20, 1964, Ser. No. 412,647
4 Claims. (Cl. 62—183)

The present invention relates to an air conditioning system for use in buildings having refrigerated compartments, equipment, and the like. More particularly, the present invention relates to a system for utilizing the heat developed from the operation of the refrigeration units for the purpose of providing sensible heat to other areas of the building.

The invention has particular application as a modification to an existing installation using a liquid coolant such as water for reducing the temperature of the heat exchange medium used in the refrigerating units of the installation and which employ a hot air system for heating the surrounding area.

A primary object of the present invention is to provide an air conditioning system using the sensible heat from the refrigerating units to heat the surrounding area and having novel controls to operate in a highly efficient and effective manner, effecting a considerable saving in heating fuel.

A further object of the invention is to provide a novel system of modifying the conventional equipment which involves minimum additional apparatus and investment in the installation.

A further object of the invention is to provide an improved system which operates effectively under normal conditions and which is also effective to avoid damage to the equipment in the event of power failure or malfunctions in the system.

Figure 1:
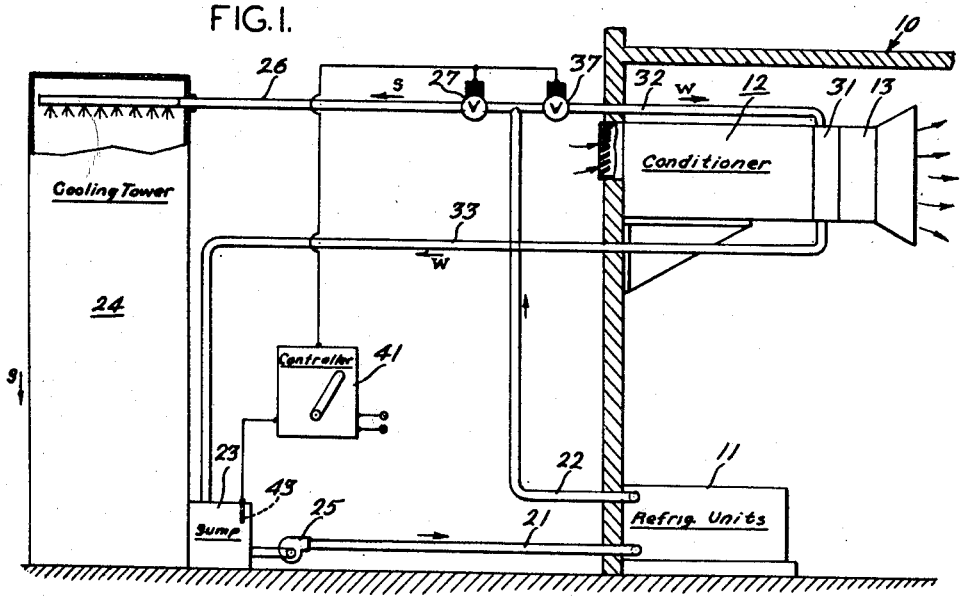
Figure 2:
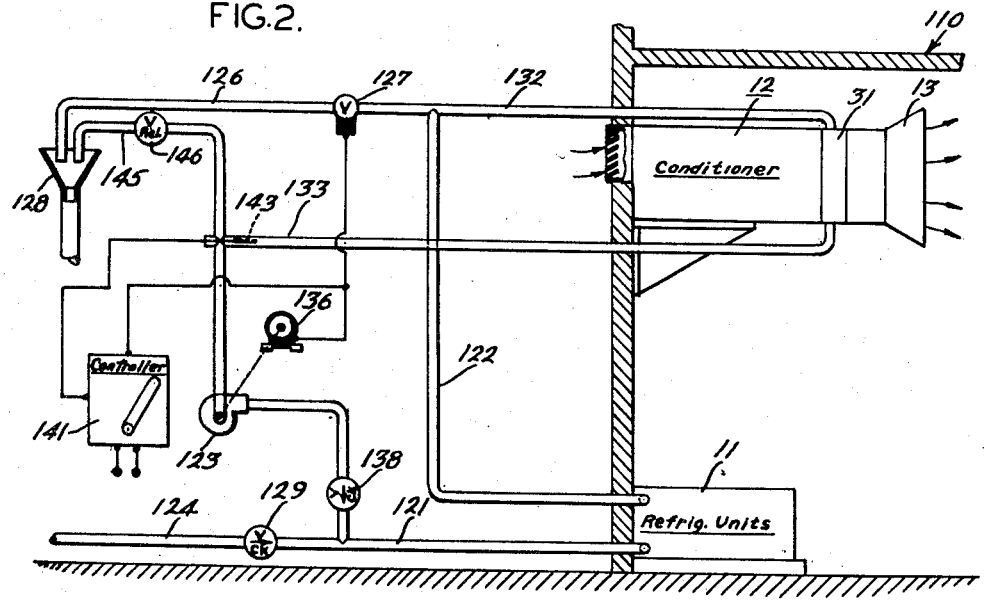

All of the objects of the present invention are more fully set forth hereinafter with reference to the accompanying drawing, wherein:

FIGS. 1 and 2 are schematic illustrations of air conditioning systems embodying the present invention.

Referring to the embodiment shown in FIG. 1, the system is illustrated therein in connection with a market building 10 having at least one conventional refrigeration unit 11 for the compartments and/or display cases and a substantially conventional hot-cold air conditioning system including a conditioner 12 and a blower 13 for conditioning the air in the building 10. The refrigeration unit 11 includes the usual compressors, coils, and condensers with expansion valves having a supply line 21 and return line 22 for the liquid coolant, normally water. The supply line 21 is supplied from the sump 23 of a conventional cooling tower 24 by means of a pump 25. The return line 22 from the unit 11 is connected to the cooling tower by a conduit 26. The controls for the unit 11 are conventional and are not illustrated or described herein.

In accordance with the invention, the heated coolant in the return line 22 may be diverted from the cooling tower 24 and used to add sensible heat to the air conditioning system. To this end, a reclaimed-heat coil 31 is included in the conditioner 12, in the present instance in advance of the blower 13. This coil is connected at one side to the return line 22 through a first branch line 32 and is connected at its other side to the cooling tower sump 23 through a second branch line 33. Thus, the heated coolant from the condenser of the unit 11 may pass through the reclaimed-heat coil 31 to the cooling tower sump instead of passing through the cooling tower 24. To this end, the conduit 26 and the branch line 32 are each provided with a solenoid valve downstream of their mutual connection. In the cooling tower conduit 26, the valve 27 is a normally-open valve operable to be closed when energized. In the reclaimed-heat branch line 32, the valve 37 is a normally-closed valve operable to be opened when energized. Thus, when the valves 27 and 37 are de-energized, the flow of coolant is as indicated by the arrows S from the return line 22 to the tower 24 through the conduit 26. On the other hand, when the valves 27 and 37 are energized, the flow of coolant from the return line 22 to the sump 23, is through the coil 31 and line 33 as indicated by the arrows W.

The energization of the valves 27 and 37 may be controlled by a controller 41. The controller 41 maintains the valves 27 and 37 de-energized during the summer months when the conditioner 12 is supplying cool air to the blower 13. During the winter months, on the other hand, the valves 27 and 37 would normally be energized so that the coolant from the return line 22 is directed through the coil 31 to the cooling tower sump 23. When operating in the latter manner, the heat from the heated coolant return line 22 is not lost to the outside atmosphere, but is recovered and used to heat the surrounding air in the building 10, thereby reducing the amount of heat which must be added in the conditioner 12 to maintain the building temperature at the desired level. This effects a considerable saving in fuel for operating the conditioner during the winter months.

In order to prevent burning-out of a condenser in the refrigerating unit 11, the coolant supplied thereto must be maintained below a certain safe temperature. The present invention provides a safety device to insure that the coolant in the supply line 21 is maintained below that temperature. To this end, a thermostat 43 is mounted in the cooling tower sump 23 to sense the temperature of the coolant in the sump. If the temperature in the sump exceeds the safe level, the thermostat 43 through a connection to the controller 41, operates to de-energize the valves 27 and 37 closing the branch line 32 and opening the conduit 26 to direct the heat exchange medium through the cooling tower until such time as the temperature of the coolant in the sump 23 falls a set amount below the safe level. Thus, the system of the present invention insures against burning out of the condenser in the refrigerating unit 11. By the same token, in the event of a power failure in the control circuit for the valves 27 and 37, the valves are de-energized to cause the return line 22 to be connected to the sump 23 through the cooling tower 24, insuring that the coolant is maintained below the safe temperature level in the supply line 21.

Thus, the conditioning system of the present invention provides a simple but fully effective means for utilizing the heat from the condenser return line to heat the building area. The system is readily installed in existing installations by simply adding a reclaimed-heat coil 31 to the store conditioning unit, a pair of standard solenoid valves, and the associated piping and controls. In accordance with the invention, the system insures the proper operation of the condenser and insures against damage to the refrigerating unit by maintaining the temperature of the coolant supplied thereto below the danger level.

In some instances, the existing refrigeration system does not embody a cooling tower, but rather utilizes fresh water as a coolant which normally discharged into the sewer or other drain after passing through the condenser. Such a system uses a considerable amount of fresh water and may be modified in accordance with the present invention, for example as illustrated in FIG. 2, in order to substantially reduce the consumption of fresh water as well as to effect a considerable saving in fuel. In this embodiment of the invention, the equipment in the market building 110 is identical to the equipment in the building 10 of the previous embodiment and corresponding reference numerals have been applied thereto. The supply line 121 for the condenser is connected to a fresh water supply line 124 through a check valve 129. The return line 122 is connected to a branch 132 leading to the reclaimed-heat coil 31 and to a drain conduit 126 through a normally-open valve 127 operable when energized to shut off the flow through the conduit 126 and operable when de-energized to afford flow into the drain 128 through the conduit 126. In normal operation, when the valve 127 is deenergized, the pressure of the supply 124 is sufficient to cause circulation of the water through the condenser and to the drain 128, thereby eliminating the need for a pump in the fresh water system. When it is desired to have the water flow through the reclaimed-heat coil 31, a pump must be used. To this end, a pump 123, for example driven by a motor 136, is connected in the line 133 from the coil 31 and discharges into the supply line 121 through a check valve 138. When the valve 127 is energized, the motor 136 is also energized to initiate operation of the pump 123 and cause flow through the reclaimed-heat coil 31. When operating with fresh water, the check valve 138 prevents back flow into the pump 123, and when operating with recirculated water, the check valve 129 prevents back flow into the supply line 124.

In this embodiment of the invention, a thermostat 143 is mounted in the connecting line 133 upstream of the pump 123 and downstream of the coil 31 so that when the temperature of the recirculated water is elevated above the safe level, the thermostat 143, through the controller 141, interrupts energization of the valve 127 and the motor 136 to terminate the recirculation and introduce fresh water into the system until the temperature of the water in the line 133 falls a set amount below the safe level.

To prevent the build-up of excess pressure in the recirculatory portion of the system, when the valve 127 and motor 136 are energized, a safety bypass 145, controlled by a pressure-responsive relief valve 146, is connected from the line 133 to the drain 128. Thus, when pressure builds up, for example because of the heating of the water, it is relieved automatically through operation of the valve 146. If pressure falls, on the other hand, it is restored automatically by the operation of the check valve 129 in the fresh water supply line.

In the operation of the systems of the present invention, the controllers are normally operated in conjunction with the controls for the conditioner 12 so that use of the reclaimed-heat coil 31 is made only when the conditioner controls call for the addition of sensible heat to the area of the building.

While particular embodiments of the present invention have been herein illustrated and described, it is not intended to limit the invention to such disclosure, but changes and modifications may be made therein and thereto within the scope of the following claims.

I claim:

1. In an air conditioning system for use in buildings having refrigerated compartments, equipment, and the like therein, said air conditioning system comprising a conditioner for the air in said building and a blower for discharging the conditioned air into said building, said refrigerated compartments, equipment, and the like having at least one refrigerating unit embodying a condenser operable to be cooled by a liquid coolant, a line to supply liquid coolant to said unit, and a line to discharge the heated coolant from said unit, the improvement comprising a normally-open energizable valve in said discharge line, a first branch line connected to said discharge line intermediate said refrigeration unit and said valve, a second branch line connected to said supply line, a reclaimed-heat coil in said air conditioning system adjacent said blower in the path of the air being discharged into the building by said blower, said coil being connected at one end to said first branch line and connected at the other end to said second branch line to form a loop including said supply line, said refrigeration unit, said discharge line, said first branch line, said coil, and said second branch line, energizable means in said loop operable when energized to afford flow therethrough and operable when de-energized to prevent flow through said loop, a controller operable to simultaneously energize and de-energize both said energizable valve and said energizable means, and a thermostat responsive to the temperature of the coolant flowing through said loop downstream of said coil and upstream of said refrigeration unit and operatively connected to said controller, said thermostat being operable to interrupt energization of both said energizable valve and energizable means to thereby interrupt flow of coolant through said loop when the temperature of said coolant rises above a predetermined safe level and to re-energize both said energizable valve and said energizable means when the temperature of said coolant falls a set amount below said safe level.

2. An air conditioning system according to claim 1 wherein said energizable means in said loop comprises an energizable, normally-closed valve, and including a cooling tower for cooling said coolant, said discharge line being connected to the cooling tower downstream of said first energizable valve, a sump for receiving the coolant from said tower, and a pump connecting said sump to said supply line, said second branch line being connected directly to said sump, said thermostat being responsive to the temperature of the coolant in said sump to control energization of both said normally-open and said normally-closed valves.

3. An air conditioning system according to claim 1 wherein said return line is connected to a drain downstream of said energizable valve, and wherein said energizable means comprises a pump in said second branch line, and including a pressure relief valve connected at one side to said second branch line in advance of said pump and connected at the other side to the drain, said thermostat being mounted in said second branch line in advance of said pump.

4. In an air conditioning system for use in buildings having refrigerated compartments, equipment, and the like therein, said air conditioning system comprising a conditioner for the air in said building and a blower for discharging the conditioned air into said building, said refrigerated compartments, equipment, and the like having at least one refrigerating unit embodying a condenser operable to be cooled by a liquid coolant, a line to supply liquid coolant to said unit, and a line to discharge the heated coolant from said unit, the improvement comprising a valve in said discharge line, a first branch line connected to said discharge line intermediate said refrigeration unit and said valve, a second branch line connected to said supply line, a reclaimed-heat coil in said air conditioning system adjacent said blower in the path of the air being discharged into the building by said blower, said coil being connected at one end to said first branch line and connected at the other end to said second branch line to form a loop including said supply line, said refrigeration unit, said discharge line, said first branch line, said coil, and said second branch line, energizable means in said loop operable when energized to afford flow therethrough and operable when de-energized to prevent flow through said loop, a controller operable to energize and de-energize said energizable means, said valve being normally open when said energizable means is deenergized and closed when said energizable means is energized, and a thermostat responsive to the temperature of the coolant flowing through said loop downstream of said coil and upstream of said refrigeration unit and operatively connected to said controller, said thermostat being operable to interrupt energization of said energizable means to thereby interrupt flow of coolant through said loop when the temperature of said coolant rises above a predetermined safe level and to re-energize said energizable means when the temperature of said coolant falls to set amount below said safe level.

References Cited by the Examiner

UNITED STATES PATENTS

| 2,797,068 | 6/57 | McFarlan | 62—159 |
| 2,883,836 | 4/59 | Sacks | 62—267 |

WILLIAM J. WYE, *Primary Examiner.*

UNITED STATES PATENT OFFICE
CERTIFICATE OF CORRECTION

Patent No. 3,186,183　　　　　　　　　　　　　　　　June 1, 1965

John P. Murdoch

It is hereby certified that error appears in the above numbered patent requiring correction and that the said Letters Patent should read as corrected below.

Column 5, line 6, for "to" read -- a --.

Signed and sealed this 30th day of November 1965.

(SEAL)
Attest:

ERNEST W. SWIDER　　　　　　　　　　　　　　　　EDWARD J. BRENNER
Attesting Officer　　　　　　　　　　　　　　　　Commissioner of Patents